United States Patent [19]

Staniland et al.

[11] 3,959,101

[45] May 25, 1976

[54] IRRADIATED AROMATIC POLYSULPHONES OF INCREASED FLOW RESISTANCE AND MOLECULAR WEIGHT

[75] Inventors: Philip Anthony Staniland, Welwyn; Graham Jarrett, Hitchin, both of England

[73] Assignee: Imperial Chemical Industries Limited, London, England

[22] Filed: July 23, 1973

[21] Appl. No.: 381,382

Related U.S. Application Data

[63] Continuation-in-part of Ser. No. 207,948, Dec. 14, 1971, abandoned.

[30] Foreign Application Priority Data

Dec. 22, 1970 United Kingdom............... 60906/70

[52] U.S. Cl....................... 204/159.11; 204/159.18; 260/49; 260/79; 260/79.3 M; 260/2.5 R; 264/22

[51] Int. Cl.²........................ C08F 1/00; C08F 8/18; C08G 75/00

[58] Field of Search.................. 204/159.11, 159.14; 260/79.3 R, 79, 79.3 M, 49

[56] References Cited

UNITED STATES PATENTS 2,921,006  1/1960  Schmitz et al. ................ 204/159.15
3,491,063  1/1970  Fukui et al. ..................... 204/159.21
3,518,177  6/1970  Marans et al. .................. 204/159.21

FOREIGN PATENTS OR APPLICATIONS 1,107,255  3/1968  United Kingdom............ 260/79.3 R

OTHER PUBLICATIONS

Davis et al., Electron Irradiation Stability of Polysulphone, *Die Makromolekulare Chemie* 129, (1969), pp. 63–72.

Brown et al., The Radiation Stability of an Aromatic Polysulfone, *Polymer Letters*, vol. 8, pp. 121–126.

*Primary Examiner*—Richard B. Turer
*Attorney, Agent, or Firm*—Cushman, Darby & Cushman

[57] ABSTRACT

Aromatic polymers of increased resistance to flow and molecular weight are obtained by irradiation using β-rays or γ-rays at temperatures up to 400°C of an aromatic polymer whose molecular chains comprise benzenoid groups and bivalent linking groups, and where irradiation is γ-rays by heating subsequent to irradiation at 200°C to 400°C.

17 Claims, No Drawings

IRRADIATED AROMATIC POLYSULPHONES OF INCREASED FLOW RESISTANCE AND MOLECULAR WEIGHT

This is a continuation-in-part of our application U.S. application Ser. No. 207,948 filed Dec. 14, 1971, and now abandoned.

This invention relates to aromatic polymers of increased molecular weight.

An article by J. R. Brown and J. H. O'Donnell in Polymer Letters 1970 volume 8 pages 121–126 describes irradiation of aromatic polysulphone with γ-radiation and concluded that the radiation stability thereof was the highest reported for any organic polymer. They found that there was a small net rate of degradation on irradiation in air and of cross-linking in vacuum. It is therefore surprising that irradiation with electron-beam/β-ray leads to an increase in molecular weight and in resistance to flow often accompanied by increase in tensile break strength and yield strength.

According to the present invention, aromatic polymers having increased molecular weight and resistance to flow are produced by the exposure to a total does of 10 to 150 Mrads of ionizing radiation selected from electron beam and β-ray at temperatures of up to 400°C of at least one aromatic polysulphone containing repeat units —Ar-SO$_2$— (where Ar is a bivalent aromatic residue which may vary from unit to unit in the polymer chain and at least some of the Ar units have an aromatic ether or thioether group in the polymer chain ortho or para to at least one —SO$_2$— group). Low doses of electron beam/β-ray radiation may increase the molecular weight of the polysulphone while leaving it thermoplastic; the higher doses result in cross-linking of the polymer chains so that the polymer becomes insoluble in solvents and is no longer thermoplastic. The effect of irradiation is enhanced if the irradiated aromatic polysulphone is heated after irradiation at temperatures of 200°C to 400°C.

Aromatic polymers having increased molecular weight and resistance to flow are also produced by irradiation with γ-rays at temperatures up to 400°C followed by heating at 200°C to 400°C.

Post irradiation heating is essential where radiation is other than electron beam/β-ray because radiation other than those is usually available only at low dose rates. Where radiation is electron beam/β-ray, post-irradiation heating is not essential but may be desirable to increase the effect of irradiation or to produce a required amount of cross-linking from a lower dose of radiation.

Aromatic polysulphones and methods for making them, are described in British Pat. Nos. 1,016,245; 1,060,546; 1,078,234; 1,109,842; 1,122,192; 1,133,561; 1,153,035; 1,153,528; 1,177,183, and 1,234,301, United States Pat. No. 3,432,468, Netherlands Pat. Nos. 69 03070 and 70 11346 and German Pat. No. 1 938 806, the disclosures of which are incorporated herein by reference.

The aromatic polysulphones described in the above-mentioned specifications comprise repeating units of the formula —Ar-SO$_2$— in which Ar is a bivalent aromatic radical and may vary from unit to unit in the polymer chain (so as to form copolymers of various kinds). Thermoplastic polysulphones generally have at least some units of the structure

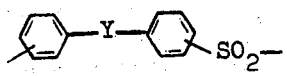

in which Y is oxygen or sulphur or the residue of an aromatic diol such as a 4,4'-bisphenol. One example of such a polysulphone has repeating units of the formula

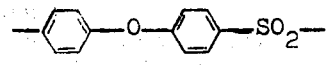

another has repeating units of the formula

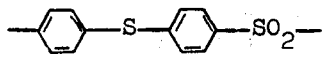

and others (which are commercially available in the United States of America) are said to have repeating units of the formula

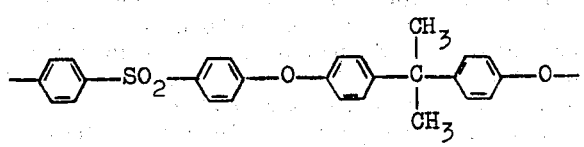

(Union Carbide Corporation) or copolymerised units in various proportions of the formulae

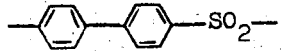

and

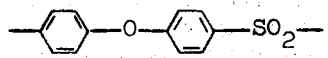

(Minnesota Mining and Manufacturing Company). Another group of aromatic polysulphones has repeating units of the formula

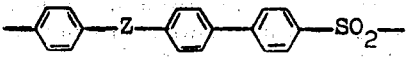

(where Z is oxygen or sulphur), and these may also be copolymerised with units of other formula given above.

The polymers of increased molecular weight and resistance to flow according to the invention are therefore prepared by irradiating the aromatic polysulphone with electronbeam/β-ray ionizing radiation or with γ-ray followed by post-irradiation heating. Preferred radiation is electron beam which is produced for example by accelerators or linear accelerators. Electron accelerators having arc voltages of between 100 kev and 4 Mev are preferred. The aromatic polysulphone may be irradiated in air, in an inert atmosphere for example nitrogen or in vacuo although for industrial applications irradiation in air is more attractive. The dose of the radiation required to increase the molecular weight of the aromatic polymer depends on a number of factors such as the temperature at which irradiation is carried out, the form of aromatic polymer, and the susceptibility of the aromatic polymer to cross-linking and the presence of any cross-linking agents and whether the irradiation is carried out in air or a partial vacuum. For example, a film requires less intense radiation for uniform crosslinking than a moulding having appreciable thickness and thus requiring higher intensity radiation for appreciable penetration. Because a cross-linked aromatic polymer is essentially non-thermoplastic, it is convenient to form the aromatic polymer into the required shape before radiation.

If, however, where ionizing radiation is electron beam/β-rays and the radiation dose is not sufficient to effect cross-linking of the polymer, there will still be an increase in the molecular weight and resistance to flow of the polymer, which remains thermoplastic. Such a dose might be for example 25 M Rads at 100°C. Subsequent heating up to a temperature of 400°C for up to 36 hours as hereinbefore described will lead to a further increase in molecular weight. This heating may be carried out on the irradiated product directly or may be part of a thermoforming stage such as for example extrusion and/or moulding.

Cross-linking may be more readily effected if the aromatic polymer is mixed with up to 5% by weight of sulphur as a cross-linking agent, as may be present in a sulphur compound such as for example elemental sulphur, aliphatic and aromatic dithiols, and aliphatic and aromatic polydisulphides; but melt fabrication of such a mixture before irradiation may be hindered by cross-linking promoted by the presence of the sulphur compound. Elemental sulphur up to a concentration of 5% w/w is preferred. Hence for example noticeable cross-linking occurs on exposure of a film having a thickness 25 μm, prepared from a thermoplastic aromatic polysulphone containing 1% w/w elemental sulphur to an electron beam dose of 40 M Rads at 20°C.

The polymers of the invention may be used for example in the preparation of heat resistant films, foams, mouldings, coatings, and heat resistant insulation of electrical conductors. They may be used in laminates in which the polymers form the adhering members and/or the adhesive bonding them.

A foamed product may be prepared if the aromatic polysulphone is mixed with between 1% and 5% by weight of elemental sulphur and the mixture heated and irradiated in the absence of imposed pressure at a temperature between 300°C and 450°C. A foamed product may also be prepared if the aromatic polysulphone is foamed with a conventional blowing or foaming agent, and subsequently irradiated.

The invention is illustrated by the following examples, in which the physical properties of the materials were measured as follows:

Reduced viscosity of the polysulphone was measured on a solution in dimethylformamide at 25°C containing 1g of polymer in 100 cm³ of solution.

The "cut-through" temperature was determined using an apparatus similar to that of ASTM D1676, in that the apparatus had two electrodes comprising uninsulated tensioned copper wire mounted one above the other and separated by a piece of film under test. The upper electrode was subjected to a 1 kg downward vertical load and the apparatus was placed in an oven with air circulation having a rate of temperature rise of 5° ± 1°C per minute. The temperature at which the film softened sufficiently to allow continuity of circuit between the two electrodes was noted as the cut-through temperature.

The "yield strength", "break strength" and "elongation" of the film samples were determined at about 20°C on an "Instron" TM/M tensile tester having a clamp speed of 20 mm/min. and using a film sample 20 mm long and 10 mm wide.

EXAMPLE 1

A sample of polysulphone having repeat units of the formula

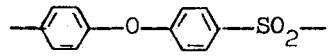

prepared in a manner similar to that described in Example 3 of British Patent Specification 1 153 035 and having a reduced viscosity of 0.5 was extruded into film having a thickness of 250 μm using an extruder having screw diameter 40 mm and barrel temperature 350°C.

Portions (A to F) of the film were irradiated with electron beam produced on a linear accelerator having an arc voltage of 4 Mev and providing a dose rate of 3.5 × 10⁶ Rads/min. Portion (G) was not irradiated and served as a control sample and portion (H) was heated for 10 minutes at 280°C but not irradiated. The results shown in the accompanying table show that irradiation produced film having increased resistance to flow, higher cut-through temperature, superior resistance to solvents, and lower elongation at break whilst the yield strength remained essentially unchanged.

|  | A | B | C | D | E | F | G | H |
|---|---|---|---|---|---|---|---|---|
| Exposure time (minutes) | 3 | 5 | 10 | 10 | 10 | 15 | 0 | 0 |
| Exposure temperature (°C) | 295 | 350 | 160 | 275 | 330 | 300 | — | 280 |
| Test (after irradiation) | | | | | | | | |
| Immersion in xylene | very slight crazing after 2.5 hours | very slight crazing after 2.5 hours | slight crazing after 1 hour | slight crazing after 1 hour | no crazing after 2.5 hrs | no crazing after 2.5 hrs | immediate craze | — |
| Time to flow at 270°C | >24 hour | >24 hour | 40 min. | 40 min. | >24 hour | >24 hour | 10 min. | — |
| Yield strength (MN/m²) | 85 | 83.5 | | | | 88.3 | 86.4 | 80.1 |
| Break strength (MN/m²) | 71.5 | 69.5 | | | | 73.6 | 68.7 | 66.7 |
| Elongation at break (%) | 120 | 65 | | | | 30 | 160 | 110 |
| Thickness (μm) | 54 | 56 | | | | 54 | 55 | 62 |
| Cut-through temperature (°C) | 280 | 290 | | | | 300 | 250 | |

EXAMPLE 2

A sample of polysulphone described in Example 1 but having reduced viscosity 0.4 was mixed with elemental sulphur (1% by weight) as powder on a mill at ambient temperature. A portion of the mixture was compression moulded into film having thickness 55 μm by pressing the portion between chromium plated surfaces at 300°C for 5 minutes. The surfaces were then cooled and the film removed.

| Property (units) | Unirradiated Film | Irradiated Film |
|---|---|---|
| Tensile break Strength (MN/m²) | | |
| 20°C | 71.2 | 79.6 |
| 180°C | 35.1 | 50.3 |
| Elongation at break | | |
| 20°C (%) | 103% | 49.2 |
| 180°C | 38% | 11 |
| Tensile strength after ageing for 14 days at 250°C (MN/m²) | Film flowed | 90.1 |
| Cut through temperature | 234°C | 286°C |
| Ageing under strain at 230°C | Film crazed after 14 days | Film unchanged |
| Water uptake at 20°C (%) | 2.058 | 1.95% |
| Permeability (mole meter sec$^{-1}$ newton$^{-1}$) to water vapour | $9.5 \times 10^{-13}$ | $5.0 \times 10^{-13}$ |
| Solvent resistance (a) xylene at 70°C | Film crazes immediately when placed in xylene and breaks after 6 hours | Slight crazing after 15 mins. No further change after 24 hours |

A piece of the film was irradiated at 20°C by passing the piece eight times across a source of electron beam emitted from a linear accelerator having an arc voltage of 260 kev, a current in the electron beam of 40 mA and a dose rate of 5 M Rads per pass to give a dose of 40 M Rad. The irradiated film flowed after 2.5 hours at 270°C and crazed after 1 hour in xylene, but a non-irradiated film flowed after 10 minutes at 270°C and crazed after 10 seconds in xylene.

EXAMPLE 3

Samples of film were prepared as described in Example 1 except that the polysulphone had reduced viscosity of 0.58. The film was irradiated at 260°C with an electron beam from an accelerator having arc voltage of 500 kev to provide a dose of 40 M Rads.

Results of physical testing are presented in the table below. For determination of water vapour permeability, a piece of film was used as a membrane separating a stream of nitrogen gas having relative humidity of 90% from a stream of dry nitrogen. The system was allowed to reach a steady state and the amount of water absorbed by the dry nitrogen stream through passage of water vapour through the membrane was then measured using an electrolytic hygrometer. The determinations were carried out at 27°C and the water vapour permeability calculated from the amount of water detected, nitrogen gas flow rate, membrane exposure time and thickness and surface area of the membrane.

Water uptake is expressed as percentage increase in weight of the film on immersion in water until constant weight was achieved.

In the strain ageing test, a piece of film was folded through 180° into a loop and clamped so that the distance from the edge of the clamp to the fold was 7 cm.

Similar results were obtained using film made from "Polysulfone" 1700 (Union Carbide Corporation) believed to have repeating units of the formula

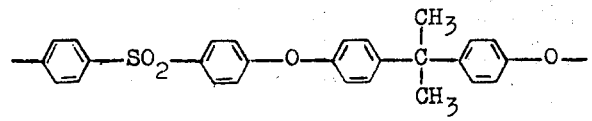

with a dose of 100 M Rads.

EXAMPLE 4

A piece of polysulphone film was prepared by the method of Example 1 except that the polysulphone had a reduced viscosity of 0.57. Portions of the film were irradiated at room temperature with electron beam from an accelerator having arc voltage of 200 kev. Some of the portions were heated before or after irradiation at 250°C for 16 hours. The tensile properties of films so treated are presented in the following table where it is apparent that irradiation followed by heating is associated with an increase in tensile break strength and a reduction in elongation of the films. The films were also insoluble in dimethyl formamide after heating.

| Film Treatment | Tensile Yield Strength (MN/m²) | Tensile Break Strength (MN/m²) | Elongation (%) |
|---|---|---|---|
| Unirradiated | 72 | 60 | 50 |
| Irraiated (dose 30 M Rads) | 71 | 59 | 88 |
| Irradiated (dose 100 M Rads) | 70 | 58 | 31 |
| Unirradiated and heated at 250°C | | Film Flowed | |
| Irradiated (dose 30 M Rads) and then heated | Did not yield | 131 | 12 |
| Irradiated (dose 100 M Rads) | Did not yield | 146 | 12 |

| Film Treatment | Tensile Yield Strength (MN/m²) | Tensile Break Strength (MN/m²) | Elongation (%) |
|---|---|---|---|
| and then heated | | | |

Similar experiments on a range of polysulphone films made from polysulphones having reduced viscosity 0.4 to 0.58 showed that films having reduced viscosity in the range 0.4 to 0.45 had the greatest resistance to radiation and that doses of up to 120 M Rads gave no detectable cross-linking before further heating. Films from polymer having reduced viscosity greater than 0.45 exhibited slight cross-linking with doses at 70 M Rads at 22°C.

EXAMPLE 5

The procedure of Example 4 was repeated except that "Polysulfone" 1700 (Union Carbide Corporation) was used as the polysulphone and the irradiated film was heated for 28 days at 250°C. The results of physical testing before and after irradiation are given in the following table.

| Film Treatment | Tensile Yield Strength (MN/m²) | Tensile Break Strength (MN/m²) | Elongation (%) |
|---|---|---|---|
| Unirradiated | 69 | 65 | 190 |
| Irradiated with dose of 45 M Rads | 70 | 60 | 129 |
| Irradiated with dose of 75 M Rads | 73 | 63 | 150 |
| Unirradiated but heated at 250°C | | Film Flowed | |
| Irradiated with 45 M Rads then heated at 250°C | Did not yield | 86 | 7 |
| Irradiated with 75 M Rads then heated at 250°C | Did not yield | 87 | 6 |

EXAMPLE 6

Samples of film described in Example 4 (using the 0.57 reduced viscosity polysulphone were irradiated at room temperature with γ-radiation from a Cobalt-60 source. Portions of the samples were heated before or after irradiation at 250°C for 16 hours. The tensile properties of resultant film are presented in the following table where it is apparent that the degree of cross-linking is not so extensive as that induced by β-rays as evidenced by Example 5.

| Film Treatment | Tensile Yield Strength (MN/m²) | Tensile Break Strength (MN/m²) | Elongation (%) | Reduced Viscosity |
|---|---|---|---|---|
| Unirradiated | 80 | 69 | 165 | 0.57 |
| Irradiated (dose 75 M Rads) | 73 | 63 | 80 | 0.40 |
| Irradiated (dose 150 M Rads) | 70 | 58 | 12 | 0.29 |
| Unirradiated and heated at 250°C | | Film Flowed | | |
| Irradiated (dose 75 M Rads) and then heated | Did not yield | 80 | 12 | 0.60 |
| Irradiated (dose 150 M Rads) and then heated | Did not yield | 88 | 11 | Slight gelation |

The results above agree with the findings described in the Polymer Letters article hereinbefore referred to, in which molecular weight of "Polysulfone" 1700 is apparently reduced by γ-irradiation at room temperature in air.

EXAMPLE 7

The procedure of Example 6 was repeated but using Polysulfone 1700 (Union Carbide Corporation) as the polysulphone and the irradiated film was heated after irradiation for 30 minutes at 250°C and then 21 days at 200°C. The results of physical testing before and after irradiation are presented in the following table.

| Film Treatment | Tensile Yield Strength (MN/m²) | Tensile Break Strength (MN/m²) | Elongation (%) |
|---|---|---|---|
| Unirradiated | 69 | 65 | 190 |
| Irradiated with 20 M Rads | 69 | 67 | 180 |
| Irradiated with 50 M Rads | 70 | 56 | 110 |
| Unirradiated then heated | — | 56 | 8 |
| Irradiated 20 M Rads then heated | — | 76 | 10 |
| Irradiated 50 M Rads then | — | 77 | 9 |

| Film Treatment | Tensile Yield Strength (MN/m²) | Tensile Break Strength (MN/m²) | Elongation % |
| --- | --- | --- | --- |
| heated | | | |

EXAMPLE 8

Polysulphone of Example 1 but having a reduced viscosity of 0.56 and in the form of cylindrical granules (2.4 mm long; 1.6 mm diameter) was irradiated with γ-radiation from a Cobalt-60 source at room temperature with doses up to 75 M Rads. The irradiated polymer was then extruded at 350°C, polymer residence time in the extruder being 80 seconds. Measurements of reduced viscosity presented in the table below show that the extrudate had increased in reduced viscosity on extrusion.

| Irradiation Dose (M Rads) | Reduced Viscosity of Chip after irradiation | Reduced Viscosity of Extrudate |
| --- | --- | --- |
| 0 (control) | 0.56 | 0.55 |
| 20 | 0.55 | 0.70 |
| 50 | 0.57 | 0.76 |
| 75 | 0.57 | 0.92 |

In a similar experiment a sample of granules of Polysulfone 1700 (Union Carbide Corporation) believed to have repeating units of the formula

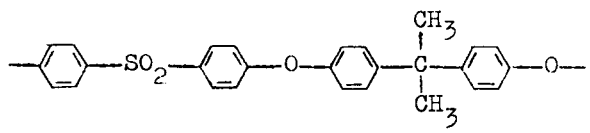

and having a reduced viscosity of 0.37 was irradiated with γ-radiation (dose 50 M Rads) and then extruded at 350°C with a residence time in the extruder of 80 seconds. The reduced viscosity of the extrudate was 0.43.

We claim:

1. An aromatic polymer having increased molecular weight and resistance to flow produced by the exposure to a total dose of 10 to 150 Mrads of ionizing radiation selected from β-ray and γ-ray at temperatures of up to 400°C of at least one aromatic polysulphone containing repeat units —Ar-SO₂— where Ar is a bivalent aromatic residue which may vary from unit to unit in the polymer chain and at least some of the Ar units have an aromatic ether or thioether group in the polymer chain ortho or para to at least one —SO₂— group, followed by heating the irradiated polysulphone to a temperature of 200°C to 400°C.

2. An aromatic polymer according to claim 1 produced by exposure to a total dose of 25 to 100 Mrads of β-ray ionizing radiation followed by said heating.

3. An aromatic polymer according to claim 1 produced by the exposure to a total dose of 25 to 150 Mrads of γ-ray ionizing radiation followed by said heating.

4. An aromatic polymer according to claim 2 wherein the heating is at a temperature of 250°C to 400°C.

5. An aromatic polymer, according to claim 1 which contains repeating units of the formula

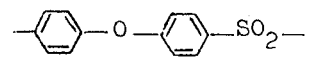

6. An aromatic polymer, according to claim 1 which contains repeating units of the formula

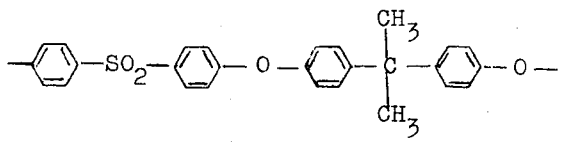

7. An aromatic polymer, according to claim 1 in the form of a shaped article.

8. An aromatic polymer, according to claim 1 in the form of a film.

9. An aromatic polymer according to claim 1, said polymer being cross-linked.

10. A method of forming an aromatic polymer comprising exposing at least one aromatic polysulphone containing repeat units —Ar-SO₂— where Ar is a bivalent aromatic residue, which may vary from unit to unit in the polymer chain, and at least some of the Ar units have an aromatic ether or thioether group in the polymer chain ortho or para to at least one —SO₂— group, to a total dose of 10 to 150 Mrads of ionizing radiation selected from β-ray and γ-ray at temperatures up to 400°C and subsequently subjecting the irradiated polymer to a temperature of 200°C to 400°C to effect cross-linking.

11. A method according to claim 10 wherein the aromatic polysulphone is subjected to a total dose of 25 to 100 Mrads of β-ray ionizing radiation.

12. A method according to claim 11 wherein the irradiated polymer is subjected to a temperature of 250° to 400°C to effect cross-linking.

13. A method according to claim 10 wherein the aromatic polysulphone is subjected to a total dose of 25 to 150 Mrads of γ-ray radiation.

14. A method according to claim 10 in which the aromatic polysulphone contains repeating units of the formula

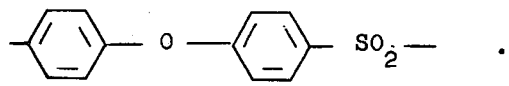

15. A method according to claim 10 in which the aromatic polysulphone contains repeating units of the formula

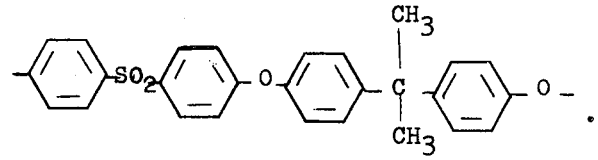

16. A method according to claim 10 wherein the aromatic polysulphone is fabricated into a shaped article prior to or during the post irradiation heating step.

17. A method according to claim 16 wherein the aromatic polysulphone is fabricated into a shaped article prior to the irradiation step.

* * * * *